United States Patent
Kobayashi

[11] Patent Number: 5,924,400
[45] Date of Patent: Jul. 20, 1999

[54] PORTABLE ENGINE

[75] Inventor: Yoshio Kobayashi, Aichi-ken, Japan

[73] Assignee: Mitsubishi Heavy Industries, Ltd., Tokyo, Japan

[21] Appl. No.: 08/986,514

[22] Filed: Dec. 8, 1997

[30] Foreign Application Priority Data

Dec. 10, 1996 [JP] Japan .................................. 8-329776

[51] Int. Cl.⁶ .................................................. F01M 1/00
[52] U.S. Cl. .............................. 123/196 R; 123/73 AD; 184/33
[58] Field of Search .......................... 123/196 R, 73 AD; 184/33, 34, 35

[56] References Cited

U.S. PATENT DOCUMENTS 5,537,980  7/1996  Yamamoto ........................... 123/447
5,701,856 12/1997  Nagano et al. ...................... 123/73 AD

FOREIGN PATENT DOCUMENTS 34774   2/1991  Japan .
666207  3/1994  Japan .

Primary Examiner—John Kwon
Attorney, Agent, or Firm—Birch, Stewart, Kolasch & Birch, LLP

[57] ABSTRACT

In a portable engine using a fuel gas within a cassette type gas bomb or canister, an engine body is provided with a lubricating oil supply for supplying a lubricating oil from an air intake port side. The supply means has a fixed quantity discharging type lubricating oil pump housed in a separation chamber between a side wall of a crankcase of the body. A recoil starter is disposed beside the side wall and a plunger is directly driven by a crank shaft. A discharge piping system has a throttle tube for controlling a flow amount and communicates between an air intake tube connected to the air intake port and a discharge port of the pump. Furthermore, there is a lubricating oil tank, a suction piping system communicating between the tank and the suction port of the pump, and a return piping system communicating the discharge side of the pump and the tank.

7 Claims, 4 Drawing Sheets

PORTABLE ENGINE

BACKGROUND OF THE INVENTION

The present invention relates to a portable engine such as a compact 2-cycle engine with a cassette suitable for being mounted to a portable operating machine of which an operating attitude of which can be freely changed, for example, a brush cutter, and using a liquefied petroleum gas such as LPG and butane within a cassette gas bomb as a fuel therefor.

A compact 2-cycle engine using the LP gas (the LPG) as a fuel is light and compact, so that it is suitable for being mounted to an operating machine such as a brush cutter. The apparatus using this fuel gas has the features as follows.

That is, since the fuel is gas, in comparison with the case when gasoline is used for the fuel, there is less trouble in the fuel supply system due to corrosion in the piping system caused by the fuel since the combustion is better performed, less HC and CO contained in the exhaust gas is discharged. Further, since it is not necessary to produce a mixed fuel including gasoline and lubricating oil for combustion, the operator's hand does not become rough due to the used fuel, the peripheral portion does not become dirty and the danger due to the fuel is reduced. Further, since the igniting performance in the case of gas is better than the case of gasoline, starting can be performed at a lever position in the idling drive state, so that no choke is required. In addition to this, the rotational speed in the driven side at a time of starting is made low so as to be safe. Still further, since the fuel is sealed within the cassette type gas bomb, the fuel can be easily attached and detached so as to be better treated.

For example, there is provided an engine disclosed in Jpn. UM Appln. KOKOKU Publication No. 3-4774 as a compact 2-cycle engine using LP gas for a fuel. The suggested 2-cycle engine is provided with a detachable gas bomb 11, an automatic pressure adjusting apparatus APC reducing a high pressure gas in the gas bomb 11 so as to supply to a Venturi tube 9 communicating with a suction port of an engine body 1, a gas leakage prevention apparatus 12, a gas amount adjusting valve 13 and a lubricating oil pump apparatus 16, as shown in FIG. 5 of the present invention. Further, the automatic pressure adjusting apparatus APC including the gas leakage prevention apparatus 12 is disposed in such a manner as to be exposed to a discharge wind from a cooling wind outlet port 10*a* of a muffler 10 so as to promote gasification of the LPG.

The gas leakage prevention apparatus 12, the gas amount adjusting valve 13 and the lubricating oil pump apparatus 16 are respectively disposed downward of the automatic pressure adjusting apparatus APC after adjusting the gas pressure, and the gas leakage prevention apparatus 12 is integrally structured with the automatic pressure adjusting apparatus APC and shuts the gas in the gas flow passage in response to the pressure within a crank case 4 of the engine body 1. The gas amount adjusting valve 13 adjusts the amount of the gas flowing through the gas flow passage, and the lubricating oil pump apparatus 16 sucks the lubricating oil from a lubricating oil tank 15 so as to inject to the Venturi tube 9.

Further, the lubricating oil pump apparatus 16 is structured in such a manner as to respectively form a pulsation pressure chamber and a pump chamber on both sides of a pump diaphragm mounted to an inside portion of the lubricating oil pump apparatus 16 and connect the pulsation pressure chamber to the crank chamber, thereby using a pulsation pressure in the crank case 4 as a back pressure in the pump diaphragm so as to operate the pump by beating the diaphragm. Accordingly, the lubricating oil within the lubricating oil tank 15 is injected into the Venturi tube 9 so as to be atomized and thereafter is mixed with the gas flowing within the Venturi tube 9 so as to be supplied to the engine body 1.

However, in the compact 2-cycle engine using LP gas for the fuel, there is produced some problems to be solved. Accordingly, in the compact engine, as is representative of the case of being mounted to the brush cutter as mentioned above, since the attitude during operation is greatly changed, there is often required a case where the engine is operated in an inverted state. Further, in order to lighten the engine, it is necessary to increase the output per the unit weight of the engine and to essentially drive at a high rotational speed. Still further, it is necessary to form as compact a unit as possible.

On the contrary, in the compact 2-cycle engine using LP gas for the fuel, the lubrication system is made as a separate lubrication system as a matter of course, so that a lubricating oil pump mechanism is required. Further, a mechanism for gasifying the LP gas and adjusting the pressure is also required. However, when the lubricating oil pump mechanism and the fuel supply mechanism added, it is disadvantageous for making the engine compact and light. Further, it is necessary to make these mechanisms suitable for conditions such as great attitude change of the engine and high rotational speed.

For example, for a lubricating oil pump for a compact 2-cycle engine having a separate lubrication system, a diaphragm type lubricating oil pump is generally employed in many cases, as described in the above publication. However, since a pump of this kind has a deteriorated responsibility with respect to the pulsation pressure within the crank chamber of the engine at a time of high speed rotation, and it is difficult to increase the oil hydraulic pressure, there is a risk that the supply amount of the lubricating oil becomes insufficient at a time when the engine is driven at a high speed load.

SUMMARY AND OBJECTS OF THE INVENTION

Accordingly, a first object to be solved is to obtain a portable engine capable of securely supplying a lubricating oil to an engine body.

Since a compact engine of this type is mounted to a portable operating machine and the like representative of the brush cutter as mentioned above, there is a case where the engine is greatly inclined or inverted corresponding to the operation of the operating machine. However, for example, in the lubricating oil tank 15 in the portable engine described in the publication above, since no special means for preventing the leakage of the lubricating oil is provided, there is a risk that the lubricating oil is leaked from the lubricating oil tank 15 in accordance with the large attitude change such as the inclination and the inversion.

A second object to be solved is to obtain a portable engine capable of preventing a leakage of a lubricating oil without relation to an attitude change while solving the first object.

Further, in the portable engine described in the above publication, in order to promote the gasification of the LPG supplied from the gas bomb 11, the automatic pressure adjusting apparatus APC is disposed near the gas bomb 11 and is adjacent to the cooling wind outlet port 10*a* of the muffler 10. However, since the distance between the gas bomb 11 and the automatic pressure adjusting apparatus APC is short, there is a risk that the LPG enters into the automatic pressure adjusting apparatus APC before being sufficiently gasified. In addition to this, since the fuel gas supply passage from the fuel port of the gas bomb 11 to the Venturi tube 9 is formed by a multiplicity of parts such as the automatic pressure adjusting apparatus APC, the gas leakage prevention apparatus 12, the piping for the gas flow passage and the like, the number of the parts is increased and the structure is complex.

Accordingly, a third object to be solved is to obtain a compact and light portable engine in which a structure and a disposition of a supply system for a LP gas fuel and a lubricating oil pump system are rationalized and simplified and gasification of LPG can be securely performed.

The present invention has the following features in order to achieve the above objects.

At first, the present invention is premised on a portable engine using a fuel gas within a cassette type gas bomb and provided with a separate type lubricating oil supply apparatus for supplying a lubricating oil to an engine body from an air intake port.

Then, in order to solve the first object mentioned above, the feature of the engine in accordance with the present invention is that the lubricating oil supply means is provided with a fixed quantity discharging type lubricating oil pump housed in a separation chamber between a side wall of a crank case of the engine body and a starter disposed beside the side wall and having a plunger directly driven by a crank shaft, a discharge piping system having a flow amount adjusting throttle and communicating between an air intake tube connected to the air intake port and a discharge port of the pump, a lubricating oil tank, a suction piping system communicating between the tank and the suction port of the pump, and a return piping system communicating the discharge side of the pump and the tank.

In accordance with the above feature, the lubricating oil pump sucks the lubricating oil within the lubricating oil tank through the suction piping system by the operation of the pump, and at the same time, discharges the lubricating oil to the air intake tube through the discharge piping system, thereby supplying the lubricating oil to the engine body. At this time, the flow amount adjusting throttle controls the flow amount of the lubricating oil passing through the discharge piping system so as to constantly discharge. Accordingly the excess lubricating oil in the lubricating oil pump is returned to the lubricating oil tank through the return piping system by the discharge pressure of this pump.

Since the fixed quantity discharging type lubricating oil pump operating in the above manner is structured such that the plunger thereof is directly communicated to the motion of the crank shaft of the engine body so as to operate the pump, that is, a direct type pump, as is different from the diaphragm type, the pump directly responds to the rotation of the crank shaft so as to provide a significantly improved response time and can obtain an increased pressure for supplying the lubricating oil by the axial motion of the plunger.

In order to solve the second object mentioned above, the preferable feature of the present invention is that a one-way valve for allowing the lubricating oil to pass only in an inner direction from an outer portion of the tank body is provided in an inlet portion of the tank body of the lubricating oil tank.

In accordance with the above feature, the following effects can be obtained. Accordingly, since the one-way valve provided in the inlet portion of the tank body allows the lubricating oil to pass only in the inner direction from the outer portion of the tank body but does not allow the lubricating oil in to pass the inverted direction, even when the attitude of the portable engine during use is greatly inclined or inverted, the lubricating oil within the tank body is prevented from leaking outward through the inlet port thereof by the inverted flow prevention effect of the one-way valve. Of course, since the one-way valve does not disturb supply of the lubricating oil into the tank body and communicates the air introduced from the outer portion through the inlet portion together with the suction of the lubricating oil during the operation of the pump, the portion within the tank body does not experience negative pressure.

In order to solve the third object mentioned above, the preferable feature of the present invention includes a bomb joint to which the fuel port of the bomb is attached and detached the bomb joint is provided in a housing holder to which the gas bomb is attached and detached, a fuel cock for opening and closing the fuel passage is provided in the joint. A gas inlet for a fuel gas regulator is disposed upstream of the air intake tube and an outlet port of the fuel passage are communicated with each other by a fuel gas supply pipe made of a material having a good heat conductivity characteristic. Furthermore that the middle portion of the supply pipe is disposed adjacent to a cooling wind outlet port provided in the engine body.

In accordance with the above feature, the following effects can be obtained. Accordingly, since the LPG supply passage from the gas bomb to the fuel gas regulator is formed by a bomb joint including the fuel cock and a fuel gas supply pipe, the number of the parts can be reduced. In this supply passage, the flow passage and the shut off of the LPG passing therethrough are performed by opening and closing the fuel cock. Further, since one fuel gas supply pipe is made of a material having a good heat conductivity characteristic, and the middle portion thereof is disposed near the cylinder cooling wind outlet port in such a manner as to be exposed to the wind flown out from the cylinder cooling wind outlet port, the LPG can be heated by the wind having a high temperature and flown out from the cooling wind outlet port when the LPG flows through the fuel gas supply pipe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A compact 2-cycle engine (a portable engine) with a LPG cassette bomb in accordance with a first embodiment of the present invention will be explained below with reference to FIGS. 1 to 4. In this case, the engine is mounted to, for example, a brush cutter (not shown) as a power plant.

Figure 1:
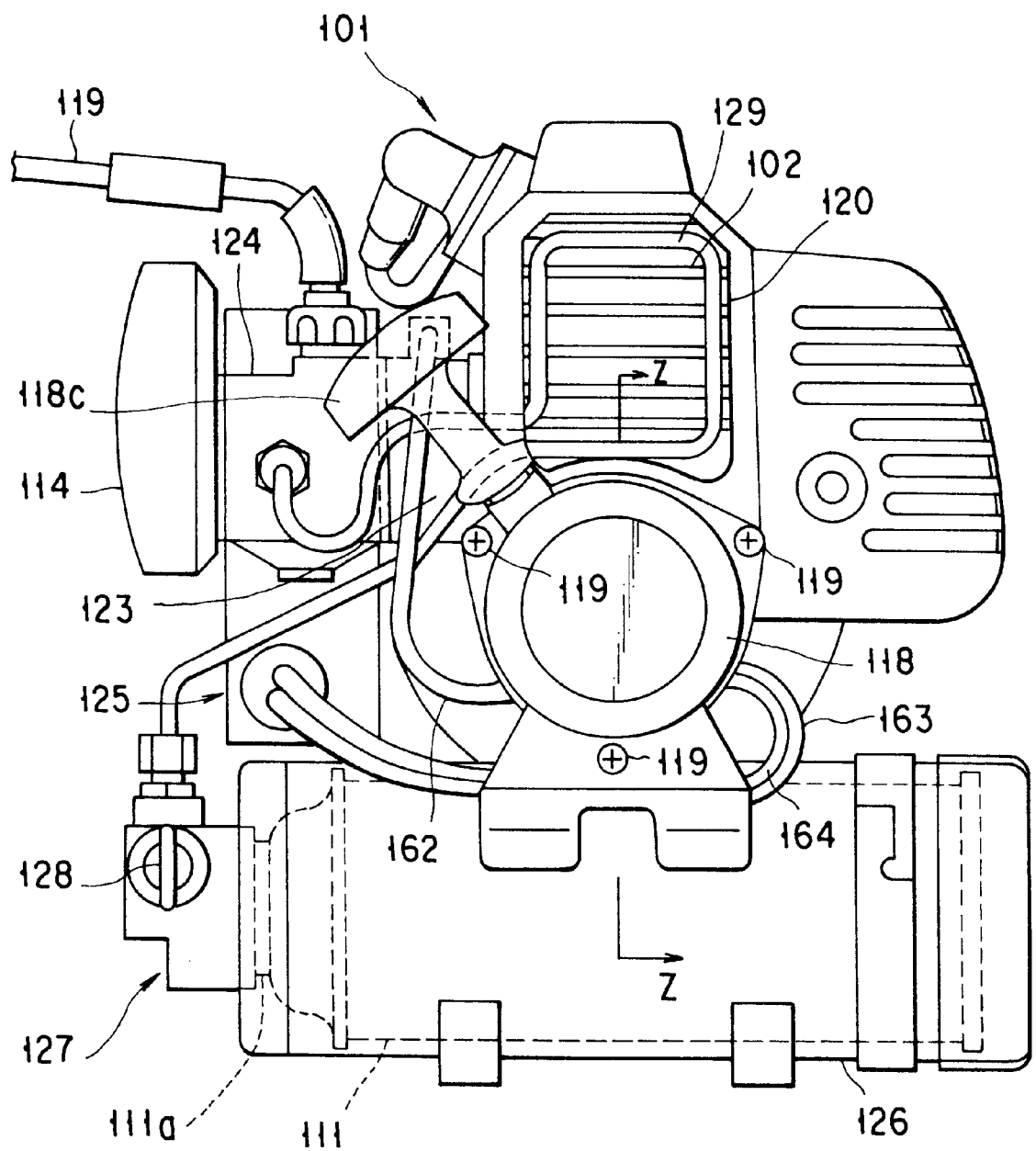
FIG. 1 is a side elevational view which shows a total structure of a compact 2-cycle engine with a LPG cassette bomb in accordance with a first embodiment of the present invention.

In FIG. 1, reference numeral 101 denotes an engine body. The body 101 is structured in a general manner and comprises a cylinder 102, a piston (not shown) disposed in such a manner as to freely reciprocate in an axial direction within the cylinder 102 and a crank shaft 121 (refer to FIGS. 2 and 3) supported within a crank case 104 (refer to FIGS. 2 and 3) below the cylinder 102 in such a manner as to freely rotate the crank shaft 121 is connected to the piston through a connecting rod (not shown). The cylinder 102 has an air intake port and a discharge port which are not illustrated in a side portion thereof.

The engine body 101 is structured such as to supply a gas mixture of air introduced to the air intake port, the fuel gas and the lubricating oil into the crank chamber of the crank case 104 so as to previously pressurize the gas mixture. Furthermore, the previously pressurized gas mixture is supplied into the cylinder 102 so as to ignite and burn and to discharge the combustion gas produced thereby to the outer portion through the exhaust port and the exhaust muffler (not shown) connected thereto. Further, the engine body 101 is provided with a cooling fan (not shown) and is structured such that the cylinder 102 is forcibly cooled by the wind fed by the fan. Reference numeral 120 in FIG. 1 denotes an outlet port for a cylinder cooling air having a cooling fin disposed on the outer surface of the cylinder 102 in such a manner as to be exposed.

Figure 3:
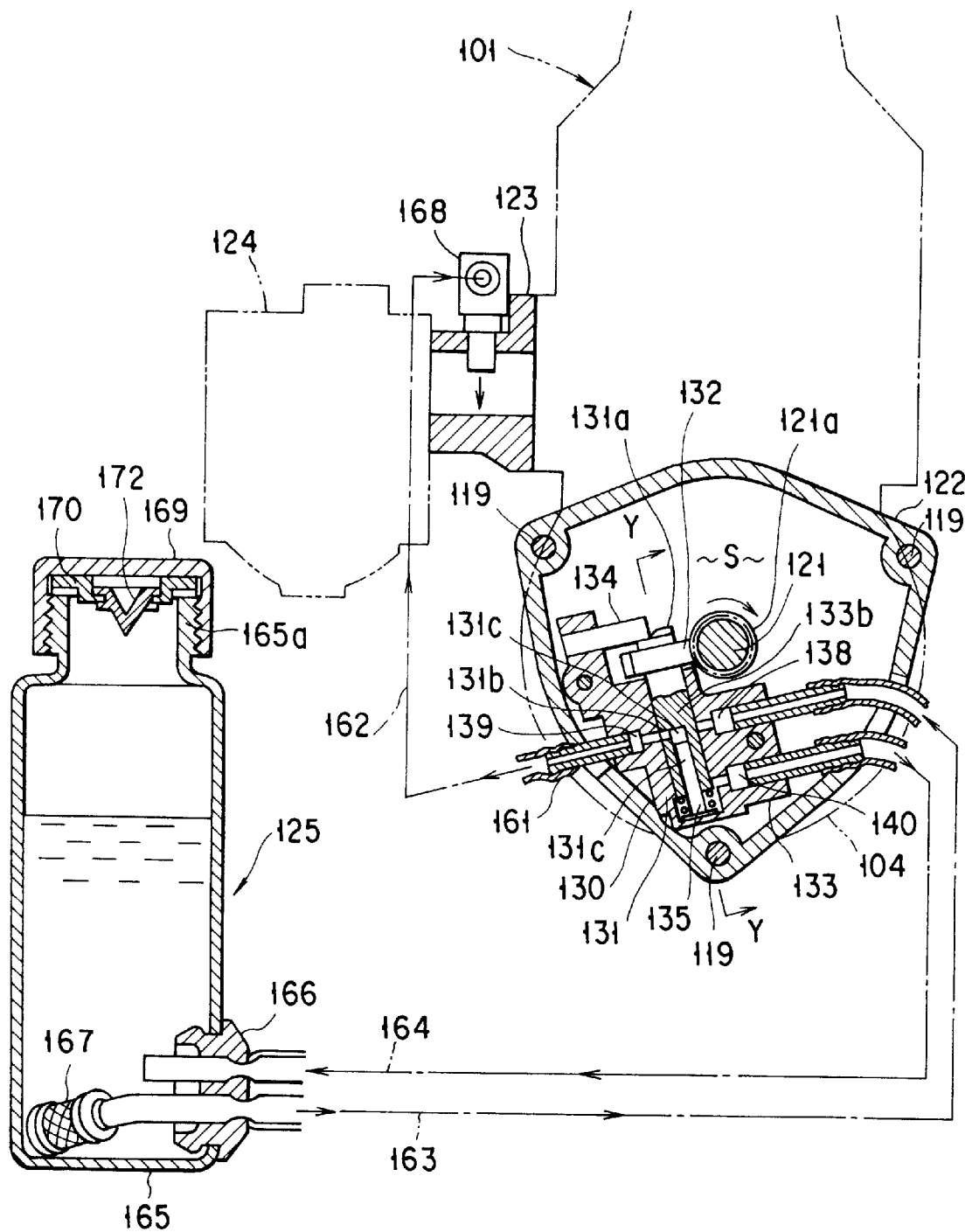
FIG. 3 is a schematic view which shows a structure of a lubrication system for lubricating oil in the compact 2-cycle engine with the LPG cassette bomb in accordance with the first embodiment.

As shown in FIGS. 1 and 3, an air intake tube 123 (that is an insulator) made of adiabatic material and communicated with the air intake port is mounted to the engine body 101. An air cleaner 114 is also mounted to the engine body through a fuel gas regulator 124 at an upstream side thereof. The structure in which the insulator 123 is disposed between the cylinder 102 and the fuel gas regulator 124 makes the distance between the cylinder 102 and the fuel gas regulator 124 narrower, thereby making the total structure of the engine compact.

The fuel gas regulator 124 disposed between the air cleaner 114 and the air intake tube 123 is provided with an automatic pressure adjusting portion (not shown) for automatically maintaining the gas pressure of the LPG mentioned below and supplied thereto in an appropriate amount, and a throttle valve for adjusting the mixture gas flow amount. In other words, for increasing and decreasing the mixture rate of the fuel gas and the air. Further, a throttle wire 119 driven by a throttle lever (not shown) is mounted to the fuel gas regulator 124. An opening degree of the throttle valve can be adjusted through the wire 119.

The engine in accordance with the present invention uses LP gas (the liquefied gas) previously charged into a cassette type gas bomb as the fuel. For example, a cassette type LPG gas bomb or gas canister 111 (referred to hereinafter as gas bomb) popularly sold and filled with LPG can used. As shown in FIG. 1, the gas bomb 111 is detachably mounted to a housing case 126 corresponding to a bomb holder disposed in a lower portion of the crank case 104 corresponding to the bottom portion of the engine of the present invention. The bomb housing case 126 also serves as a stand for the engine.

The bomb housing case 126 has a bomb joint 127 at an end thereof, and a fuel cock 128 for opening and closing the fuel passage (not shown) formed within the joint 127 is mounted to the joint 127. The fuel cock 128 can be manually operated. A fuel port 111a for the LPG gas bomb 111 can be inserted into and detached from the bomb joint 127. When the gas bomb 111 is housed in the bomb housing case 126. A valve (not shown) included in the fuel port 111a is automatically opened so that the LPG within the gas bomb 111 flows out to the fuel passage.

An end of a fuel gas supply pipe 129 is connected to the fuel passage outlet port of the bomb joint 127 and the other end of the pipe 129 is connected to the gas inlet port of the fuel gas regulator 124. The fuel gas supply pipe 129 is constituted by a continuous metal pipe made of a material having a good heat conductivity such as a copper alloy pipe and the like. The pipe 129 and the bomb joint 127 form the LPG supply passage from the gas bomb 111 to the fuel gas regulator 124. A middle portion of the single fuel gas supply pipe 129 is disposed near the cooling air outlet port 120 in such a manner as to be directly exposed to the air flowing out from the cylinder cooling air outlet port 120, as shown in FIG. 1. Also, the pipe 129 is drawn around, for example, in such a manner as to go around the cooling air outlet port 120, thereby being heated by the discharge air from the cylinder cooling air outlet port 120 having a high temperature.

Figure 2:
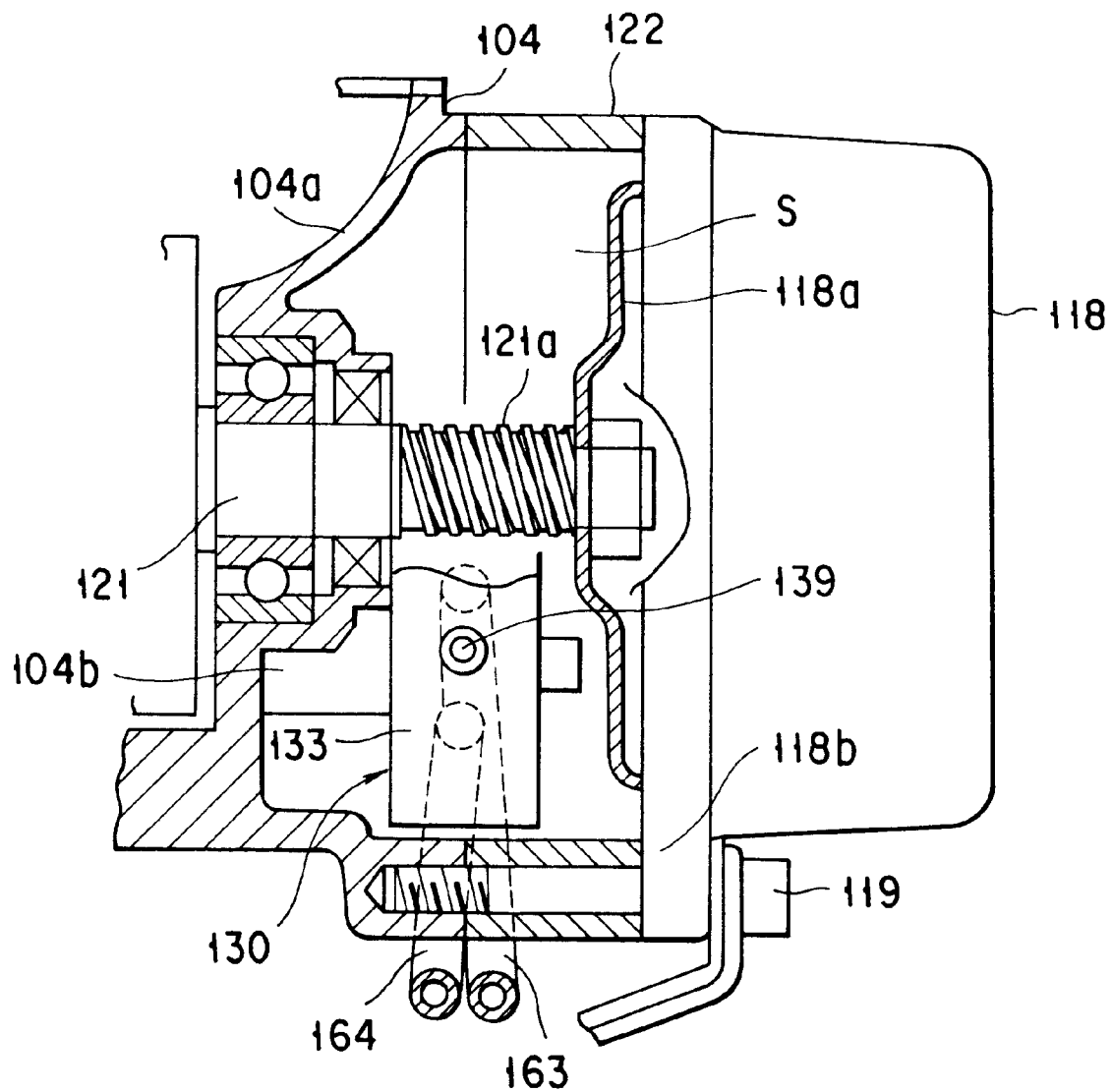
FIG. 2 is a cross sectional view taken along a line Z—Z in FIG. 1 which shows a structure in a peripheral portion of an end of a crank shaft.

As shown in FIG. 2, the shaft end portions of the crank shaft 121 at the output side and the opposed side are projected from the crank case side wall 104a. A worm 121a is formed in the shaft end portion and a starter, for example, a rotary member 118a of a recoil starter 118 is fixedly provided in the shaft end portion by a nut. The recoil starter 118 holds a gap member 122 between a cover 118b thereof and an outer surface of a crank case side wall 104a and is fixed by a plurality of bolts 119 passing through the cover 118b and the gap member 122 and screwed to the crank case side wall 104a. In this case, in FIG. 1, reference numeral 118c denotes a starter handle of the recoil starter 118 operated by drawing.

As shown in FIGS. 2 and 3, the gap member 122 has an annular shape. A separation chamber S is formed among the gap member 122, the crank case side wall 104a and the recoil starter 118. The shaft end portion of the crank shaft 121 and the rotary member 118a are housed in the separation chamber S, and the shaft end portion is disposed in such a manner as to pass through a center portion of the gap member 122. Further, a fixed quantity discharging type lubricating pump 130 is housed within the separation chamber S. In this case, reference numeral 104b in FIG. 2 denotes a pump supporting portion provided in such a manner as to project from the crank case side wall 104a.

As shown in FIG. 3, the lubricating pump 130 is provided with a pump body 133 fixed to the pump supporting portion 104b. A plunger 131 has a cam 131a formed in the end portion of the crank shaft 121 at the shaft end portion side and has a worm wheel 132 fixed thereto. A slip pin 135 is provided in such a manner as to stand up from a bottom portion (in FIGS. 3 and 4) of an oil reservoir 133a of the pump body 133. A spring 136 is wound around the pin 135 and urges the plunger 131 upward in the axial direction. Furthermore, a pin 134 is fixedly provided in the pump body 133 and the like. Reference numeral 137 in FIG. 4 denotes a stopper ring for receiving the spring.

The plunger 131 is inserted into a plunger fitting hole 133b provided in the pump 133 in such a manner as to freely rotate and move in the axial direction. The plunger 131 is fitted to the slip pin 135 disposed on the center axial line of the plunger fitting hole 133b and is provided in such a manner as to freely rotate and move in the axial direction with respect to the pin 135.

The worm wheel 132 of the plunger 131 disposed outward of the plunger fitting hole 133b is meshed with the worm 121a of the crank shaft 121. The plunger 131 can be directly moved by the crank shaft 121 by this mesh. The cam 131a of the plunger 131 is slidably brought into contact with the pin 134 by the urging force of the spring 136.

Accordingly, the plunger 131 is axially moved (downward pressed in FIG. 3) to the stopper ring 137 against the spring 136 by the pin 134 in accordance with a rotation thereof, and thereafter, is axially moved (upward pressed in FIG. 3) to the pin 134 by the spring 136, so that the plunger 131 can be axially oscillated.

Figure 4:
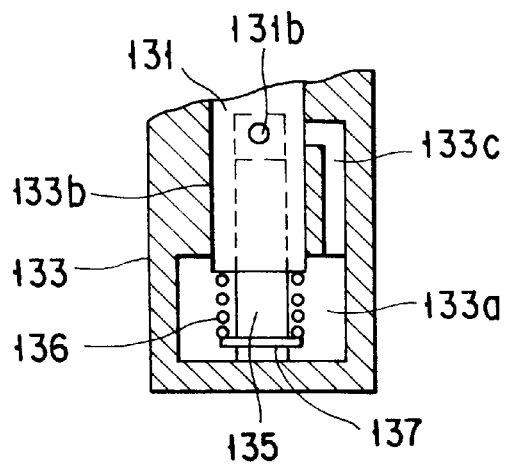
FIG. 4 is a cross sectional view taken along a line Y—Y in FIG. 3 which shows a partial structure of the lubricating oil pump.
Figure 5:
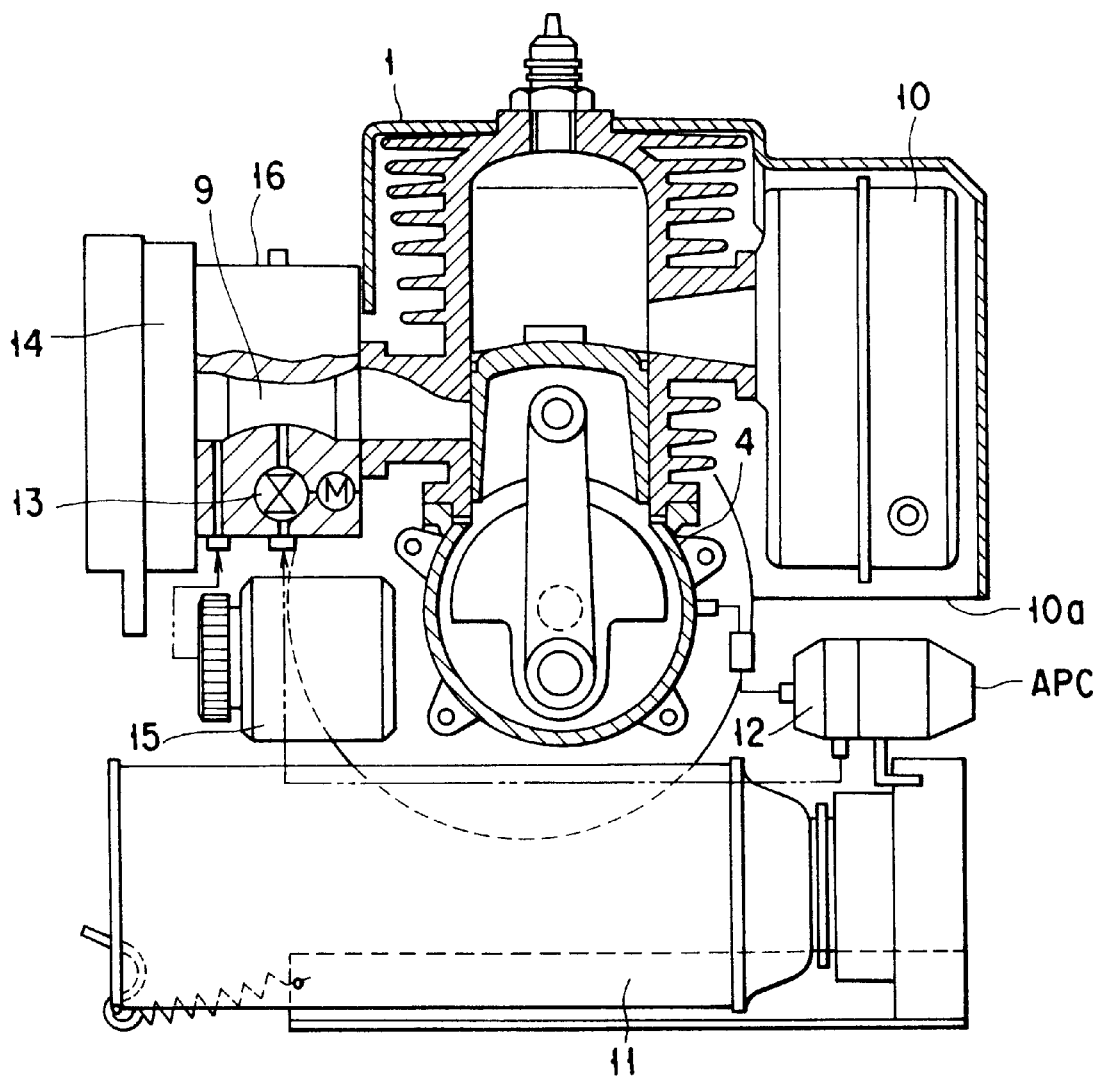
FIG. 5 is a side elevational view which shows a total structure of a compact 2-cycle engine with a LPG cassette bomb in accordance with the conventional embodiment.

The plunger 131 has a hole 131b at a right angle to an axial pin fitting hole 131c fitted to the slip pin 135. A suction port 138 for the lubricating oil, a discharge port 139 for the lubricating oil and a return port 140 for the lubricating oil are respectively provided in the pump 133. As shown in FIG. 4, a passage 133c for communicating between the plunger fitting hole 133b and the oil reservoir 133a is provided therein. The suction port 138 and the discharge port 139 are respectively provided in such a manner as to communicate with the plunger fitting hole 133b, and the return port 140 for the lubricating oil is provided in such a manner as to communicate with the oil reservoir 133a.

A pump operation of the lubricating oil pump 130 having the above structure will be described below. When the hole 131b of the plunger 131 coincides with the suction port 138 of the pump body 133, the plunger 131 is moved to the suction side (the worm wheel 132 side) by the urging force of the spring 136, so that the lubricating oil sucked to the pump body 133 from the suction port 138 is stored in the pin fitting hole 131c and the excess amount of the lubricating oil passes through the passage 133c so as to be stored in the oil reservoir 133a. Further, when the hole 131b of the plunger 131 coincides with the discharge port 139 of the pump body 133, the plunger 131 is moved to the stopper ring 137 side (the lubricating oil pressing and feeding side) by the operation of the cam 131a and the pin 134, so that the lubricating oil stored in the pin fitting hole 131c is pressed to feed to the discharge port 139, and the excess amount of the lubricating oil stored in the oil reservoir 133a is pressed to feed to the lubricating oil return port 140.

The lubricating oil supply apparatus mainly including the lubricating oil pump 130 serving the pump operation in the above manner is provided with a lubricating oil tank 125, a suction piping system 163, a discharge piping system 162 and a return piping system 164, as shown in FIG. 3.

The lubricating oil tank 125 is provided with a tank body 165 having an inlet portion 165a for supplying the lubricating oil in the above portion, a cap 169 detachably mounted to the inlet portion 165a by screwing, a middle cover 170 provided in such a manner as to be held between the cap 169 and the inlet portion 165a, and an annular packing 171. The lubricating oil tank 125 is vertically disposed in the adjacent portion of the fuel gas regulator 124 directly connected to the air intake tube 123, as shown in FIG. 1. Due to this arrangement, the projecting portion of the whole engine can be reduced and the layout of the engine can be made compact.

A one-way valve 172 allowing the lubricating oil to pass only to the inner direction from the outer portion of the tank body 165 is mounted to the middle cover 170. Accordingly, the lubricating oil and the air can be supplied into the tank body 165 through the one-way valve 172, and the one-way valve 172 can prevent the lubricating oil within the tank 165 from leaking outward due to the checking operation thereof.

The suction piping system 163 is constituted by a pipe between the bottom portion of the tank body 165 and the suction port 138 of the pump body 133. An oil filter 167 is mounted to the end portion of the pipe disposed within the tank body 165, thereby communicating between the lubricating oil tank 125 and the suction port 138. The return piping system 164 is constituted by a pipe between the bottom portion of the tank body 165 and the lubricating oil return port 140 of the pump body 133, thereby communicating between the lubricating oil tank 125 and the lubricating oil return port 140. The suction piping system 163 and the return piping system 164 are gathered in the lubricating oil tank 125 end so as to be mounted to the tank body 165 by a rubber holder 166 in a liquid tight manner.

The discharge piping system 162 is structured in such a manner as to have a throttle tube 161 mounted to the discharge port 139 of the pump body 133 and serving as a flow amount adjusting throttle. A pipe has an end portion which is mounted to the throttle tube 161. A check valve 168 mounted to the other end of the pipe. The throttle tube 161 is structured in such a manner as to restrict the flow amount of the lubricating oil flowing through the discharge piping system 162, so that the extra lubricating oil due to the restriction is returned to the oil reservoir 133a as in the manner mentioned above. In this case, the flow amount adjusting throttle 160 may be provided in any portion of the discharge piping system 162. The check valve 168 is mounted to the air intake tube 123, and is structured in such a manner as to allow the lubricating oil to flow to the air intake tube 123 from the discharge port 139 but prevent inverted flow.

The lubricating oil passing through the discharge piping system 162 having the above structure and pressed to feed from the lubrication pump 130 is atomized at the outlet port thereof and is injected into the air intake tube 123. Accordingly, the atomized lubricating oil is mixed with the flow of the air and fuel gas flowing in the air intake tube 123 so as to form a gas mixture consisting of the air, the gas and the lubricating oil, so that the mixed gas is supplied to the cylinder 102 of the engine body 101.

The engine having the above structure is started by sucking the gas mixture consisting of the air and the fuel gas from the air intake port due to the vertical motion of the piston (not shown) within the cylinder 102 caused by the drawing operation of the recoil starter 118, igniting the gas mixture after preliminarily compressing the gas mixture within the crank case 104, and discharging the combustion gas outward of the cylinder 102 from the discharge port immediately thereafter.

Since the engine using the LPG for the fuel and started in the above manner can control the mixed rate of the fuel gas by the fuel gas regulator 124 by means of a throttle lever (not shown), thereby obtaining the mixture rate of the air and the fuel gas necessary for starting, no choke is required at a time of the starting operation. Therefore, the starting operation can be easily performed. Further, since the engine uses the LPG for the fuel and has a good ignition performance, the engine can be started in the idling state, the rotational speed of the driven side is small at a time of starting, and the safety start can be achieved.

The 2-cycle engine using the LPG of the cassette type gas bomb 111 for the fuel is compact and light, and is easily operated in attaching and detaching the gas bomb 111 of the fuel. Since the fuel is the LPG, the unburned gas (HC and CO) is discharged lessin the exhaust gas. Since it is not necessary to make the mixed fuel consisting of the gasoline and the oil, the peripheral portion and the operator's hand are not dirtied. In addition there is no trouble caused by corrosion due to the fuel in the fuel supply system, so that the engine is suitable for being mounted to a portable operation machine which is hand held and the attitude of which is greatly changed such as a brush cutter.

In addition to this, since the one-way valve 172 for allowing the lubricating oil to pass only to the inner portion from the outer portion of the tank body 165 is provided in the inlet portion 165a thereof, even when the attitude is greatly changed during operation of the brush cutter, so that the whole engine is, for example, greatly inclined or inverted, the lubricating oil within the tank body 165 is prevented from leaking outward so as to make the periphery dirty. Accordingly, the portable operation machine such as the brush cutter having the engine mounted can be further easily treated. Further, since the one-way valve 172 flows air introduced from the outer portion after passing through the inlet portion of the tank body 165, the portion within the tank body 165 experiences negative pressure at a time when the lubricating oil supply apparatus operates, so that it is never difficult to suck the lubricating oil.

In this engine, although the lubricating oil is supplied to the engine body 101 by the operation of the lubricating oil pump 130 of the lubricating oil supply apparatus during operation, the fixed quantity type lubricating oil pump 130 serving as the main element is a direct type in which the plunger 131 is directly interlocked with the rotation of the worm 121a of the crank shaft 121 in the engine body 101, thereby operating the pump function. Accordingly, as is different from the conventional diaphragm type, since this pump directly responds to the rotation of the crank shaft 121, the response time is significantly high, and a high lubricating supply pressure can be obtained due to the axial motion of the plunger 131. Accordingly, the pump is sufficiently suitable to the high speed and high load operation of the engine, thereby securely supplying the lubricating oil to the engine body 101.

Further, in this engine, since the fuel gas supply pipe 129 provided in the LPG supply passage extending from the gas bomb 111 to the fuel gas regulator 124 is made of a material having a good heat conductivity characteristic and the middle portion thereof is disposed near the cylinder cooling wind outlet port 120 of the cylinder 102 in such a manner as to be exposed to the air blown from the cylinder cooling air outlet port 120, the LPG can be heated by the air having a high temperature and blown out from the cooling air outlet port 120 during passing through the fuel gas supply tube 120. Accordingly, the LPG can be securely gasified and be supplied to the fuel gas regulator 123.

Moreover, since the LPG supply passage is formed by the bomb joint 127 having the fuel cock 128, and the fuel gas supply pipe 129, the number of parts can be reduced and the structure thereof can be made simple.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A lubricating oil supply apparatus for a portable engine using a fuel gas within a cassette type gas canister, said lubricating oil supply apparatus for supplying lubricating oil to an engine body from an air intake port, said lubricating oil supply apparatus comprising:
 a) a fixed quantity discharging type lubricating oil pump for being housed in a separation chamber between a side wall of a crank case of said engine body and a starter disposed beside the side wall, said oil pump having a plunger for being directly driven by a crank shaft,
 b) a discharge piping system having a flow amount adjusting throttle, said discharge piping system for communicating between an air intake tube connected to said air intake port and a discharge port of said pump,
 c) a lubricating oil tank,
 d) a suction piping system communicating between the tank and a suction port of said pump, and
 e) a return piping system communicating between a return port of said pump and said tank.

2. The lubricating oil supply apparatus for a portable engine according to claim 1, wherein a one-way valve for allowing lubricating oil to pass only in an inner direction from an outer surface of said lubricating oil tank is provided in a lubricating oil supply port of said lubricating oil tank.

3. The lubricating oil supply apparatus for a portable engine according to claim 1 wherein a canister joint to which a fuel port of said canister is attached and detached is provided in a housing holder to which said gas canister is attached and detached, a fuel cock for opening and closing the fuel passage is provided in the canister joint, a gas inlet for a fuel gas regulator disposed upstream of said air intake tube and an outlet port of said fuel port communicate with each other by a fuel gas supply pipe made of a material having good heat conductivity, and a middle portion of the supply pipe is disposed adjacent to a cooling air outlet port provided in said engine body.

4. The lubricating oil supply apparatus for a portable engine according to claim 2, wherein a canister joint to which a fuel port of said canister is attached and detached is provided in a housing holder to which said gas canister is attached and detached, a fuel cock for opening and closing the fuel passage is provided in the canister joint, a gas inlet for a fuel gas regulator disposed upstream of said air intake tube and an outlet port of said fuel port communicate with each other by a fuel gas supply pipe made of a material having good heat conductivity, and a middle portion of the supply pipe is disposed adjacent to a cooling air outlet port provided in said engine body.

5. A portable engine using a fuel gas within a cassette type gas canister and provided with a separate type lubricating oil supply apparatus for supplying a lubricating oil to an engine body from an air intake port, said portable engine comprising:

a fixed quantity discharging type lubricating oil pump housed in a separation chamber between a side wall of a crank case of said engine body and a starter disposed beside the side wall, said oil pump having a plunger directly driven by a crankshaft;

a discharge piping system having a flow amount adjusting throttle, said discharge piping system communicating between an air intake tube connected to said air intake port and a discharge port of said pump;

a lubricating oil tank;

a suction piping system communicating between the tank and a suction port of said pump;

a return piping system communicating between a return port of said pump and said tank; and a one-way valve for allowing lubricating oil to pass only in an inner direction from an outer surface of said lubricating oil tank is provided in a lubricating oil supply port of said lubricating oil tank.

6. A portable engine using a fuel gas within a cassette type gas canister and provided with a separate type lubricating oil supply apparatus for supplying a lubricating oil to an engine body from an air intake port, said portable engine comprising:

a fixed quantity discharging type lubricating oil pump housed in a separation chamber between a side wall of a crank case of said engine body and a starter disposed beside the side wall, said oil pump having a plunger directly driven by a crankshaft;

a discharge piping system having a flow amount adjusting throttle, said discharge piping system communicating between an air intake tube connected to said air intake port and a discharge port of said pump;

a lubricating oil tank;

a suction piping system communicating between the tank and a suction port of said pump;

a return piping system communicating between a return port of said pump and said tank;

a canister joint to which a fuel port of said canister is attached and detached is provided in a housing holder to which said gas canister is attached and detached;

a fuel cock for opening and closing the fuel passage is provided in the canister joint;

a gas inlet for a fuel gas regulator disposed upstream of said air intake tube and an outlet port of said fuel port communicate with each other by a fuel gas supply pipe made of a material having good heat conductivity; and a middle portion of the supply pipe is disposed adjacent to a cooling air outlet port provided in said engine body.

7. A portable engine according to claim 5, wherein a canister joint to which a fuel port of said canister is attached and detached is provided in a housing holder to which said gas canister is attached and detached, a fuel cock for opening and closing the fuel passage is provided in the canister joint, a gas inlet for a fuel gas regulator disposed upstream of said air intake tube and an outlet port of said fuel port communicate with each other by a fuel gas supply pipe made of a material having good heat conductivity, and a middle portion of the supply pipe is disposed adjacent to a cooling air outlet port provided in said engine body.

* * * * *